United States Patent
Betz et al.

(10) Patent No.: US 9,550,482 B2
(45) Date of Patent: Jan. 24, 2017

(54) CONTROL DEVICE FOR A BRAKING SYSTEM OF A VEHICLE, AND METHOD FOR OPERATING A BRAKING SYSTEM OF A VEHICLE

(71) Applicant: Robert Bosch GmbH, Stuttgart (DE)

(72) Inventors: Christoph Betz, Moeglingen (DE); Christian Koehler, Marbach (DE); Michael Reichert, Freiberg Am Neckar (DE); Michael Bunk, Leingarten (DE); Olaf Grotheer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/649,390

(22) PCT Filed: Oct. 14, 2013

(86) PCT No.: PCT/EP2013/071376
§ 371 (c)(1),
(2) Date: Jun. 3, 2015

(87) PCT Pub. No.: WO2014/090436
PCT Pub. Date: Jun. 19, 2014

(65) Prior Publication Data
US 2015/0367824 A1    Dec. 24, 2015

(30) Foreign Application Priority Data
Dec. 11, 2012   (DE) .................. 10 2012 222 718

(51) Int. Cl.
*G06F 19/00* (2011.01)
*B60T 8/50* (2006.01)
(Continued)

(52) U.S. Cl.
CPC ............... *B60T 8/50* (2013.01); *B60T 8/1766* (2013.01); *B60T 8/4072* (2013.01); *B60T 8/4081* (2013.01);
(Continued)

(58) Field of Classification Search
CPC ........ B60T 13/586; B60T 8/267; B60T 17/22; B60T 2270/604; B60L 7/18
(Continued)

(56) References Cited

U.S. PATENT DOCUMENTS 6,062,657 A * 5/2000 Dimasi ................ B60T 13/586
                                                    303/122.13
8,892,327 B2 * 11/2014 Hachtel ................ B60T 8/3265
                                                    701/32.1
(Continued)

FOREIGN PATENT DOCUMENTS

DE           101 29 594     1/2002
DE     10 2010 040 854     3/2012
(Continued)

OTHER PUBLICATIONS

International Search Report for PCT/EP2013/071376, dated Dec. 17, 2013.

*Primary Examiner* — Gertrude Arthur Jeanglaud
(74) *Attorney, Agent, or Firm* — Norton Rose Fulbright US LLP; Gerard Messina (57) ABSTRACT

A method for operating a braking system of a vehicle includes: establishing a first setpoint brake pressure to be set in a first wheel brake cylinder of a first brake circuit and a second setpoint brake pressure to be set in a second wheel brake cylinder of a second brake circuit; reducing first and second actual brake pressures by setting a master brake cylinder pressure to be no greater than a minimum of the first and second setpoint brake pressures, and controlling a first
(Continued)

switchover valve of the first brake circuit and/or of the second brake circuit; and/or increasing the first and second actual brake pressures by setting the master brake cylinder pressure to be no smaller than a maximum of the first and second setpoint brake pressures, and activating a first wheel inlet valve of the first brake circuit and/or of the second brake circuit.

13 Claims, 2 Drawing Sheets (51) Int. Cl.
    *B60T 8/40*     (2006.01)
    *B60T 8/1766*     (2006.01)

(52) U.S. Cl.
    CPC ........ *B60T 8/4095* (2013.01); *B60T 2270/604* (2013.01)

(58) Field of Classification Search
    USPC ...................... 701/32.1, 33.9, 70; 303/3, 152
    See application file for complete search history.

(56) References Cited

U.S. PATENT DOCUMENTS

| | | | |
|---|---|---|---|
| 9,108,514 B2* | 8/2015 | Kunz | ...................... B60T 8/267 |
| 2010/0222978 A1 | 9/2010 | Kodama et al. | |

FOREIGN PATENT DOCUMENTS

| | | |
|---|---|---|
| WO | WO 2011/098175 | 8/2011 |
| WO | WO 2011/160963 | 12/2011 |

\* cited by examiner

CONTROL DEVICE FOR A BRAKING SYSTEM OF A VEHICLE, AND METHOD FOR OPERATING A BRAKING SYSTEM OF A VEHICLE

BACKGROUND OF THE INVENTION

1. Field of the Invention

The present invention relates to a control device for a braking system of a vehicle and a method for operating a braking system of a vehicle.

2. Description of the Related Art

Published German patent application document DE 10 2010 040 854 A1 describes a hydraulic braking system and a method for operating same. With the aid of a use of the hydraulic braking system or by carrying out the method for its operation, it is to be made possible to decelerate a vehicle with the aid of at least one electric motor and a hydraulic braking system.

BRIEF SUMMARY OF THE INVENTION

The present invention ensures a high pressure setting accuracy when setting the first actual brake pressure to be corresponding to or equal to the established first setpoint brake pressure and the second actual brake pressure to be corresponding to or equal to the established second setpoint brake pressure. For this purpose, components of an ESP system of the braking system may be used, which are generally already available in a conventional braking system. For convenient and accurate pressure setting implementable with the aid of the present invention, components already present may thus be used. The present invention is thus implementable without a refinement increasing manufacturing costs or the installation space requirements of the braking system.

Moreover, the present invention allows an axle-specific modulation of the actual brake pressures. At the same time it is ensurable with the aid of the present invention that a desired distribution of the braking torques between front axle and rear axle may be reliably met. A pitch of the vehicle induced by an interference in the desired distribution of the braking torques, which the driver often perceives as undesirable, is thus reliably prevented.

In one advantageous specific embodiment, the activating unit is also designed to control a Δp control of the first actual brake pressure to be reduced through the first switchover valve and/or a Δp control of the second actual brake pressure to be reduced through the second switchover valve with the aid of the at least one second control signal. This enables a high accuracy when setting the desired first actual brake pressure and/or the desired second actual brake pressure with the aid of the pressure reduction thus carried out. By using a so-called Δp control, in a first approximation, the dependency of the first actual brake pressure and/or of the second actual brake pressure to be set on the volume intake of the hydraulic braking system is also eliminated.

Alternatively or additionally, the activating unit may also be designed to control a Δp control of the first actual brake pressure to be increased through the at least one first wheel inlet valve and/or a Δp control of the second actual brake pressure to be increased through the at least one second wheel inlet valve with the aid of the at least one fourth control signal. Thus a high accuracy is ensurable also for the pressure buildup carried out in this way.

Preferably, the activating unit is also designed to activate at least one plunger as a master brake cylinder pressure varying device with the aid of the at least one first control signal and/or the at least one third control signal. The setting of the desired master brake cylinder pressure may thus be carried out independently of the wheel inlet valves and the switchover valves. In addition, the plunger is operable with the aid of a comparatively simple activation pattern, since it only needs to ensure a sufficiently large pressure difference, but not an exact pressure. For the present invention, a comparatively cost-effective plunger, in particular having a cheap activating electronic, may be used.

Preferably, the activating unit is also designed to establish the first setpoint brake pressure and/or the second setpoint brake pressure while additionally taking into account at least one generator braking torque exertable with the aid of at least one electric motor on at least one axle assigned to the at least one first wheel brake cylinder and/or the at least one second wheel brake cylinder. The present invention thereby ensures also a constant brake force distribution during a recuperation. Due to the high pressure setting accuracy, fluctuations in deceleration may be minimized during the recuperation. The present invention may thus also be used for motivating the driver to buy a vehicle equipped with the at least one electric motor, which enables a driving consuming less energy with lower emissions.

In one advantageous refinement, the activating unit is also designed to establish a setpoint variable regarding a booster force to be exerted on the brake actuating element with the aid of a brake booster, taking the input signal, the first setpoint brake pressure, the second setpoint brake pressure, the ascertained or estimated first actual brake pressure and/or the ascertained or estimated second actual brake pressure into account, and to output to the brake booster a brake booster control signal which corresponds to the setpoint variable. The setpoint variable may be establishable with the aid of the activating unit, in particular in such a way that the driver has a standard brake actuating feeling (brake pedal feeling) during the actuation of the brake actuating element. In particular with the aid of the booster force predefined in this way it may be implemented that the driver feels a counterforce/response from the brake actuating element during the actuation which corresponds to the setpoint vehicle deceleration.

The advantages listed above are also implemented in a braking system for a vehicle including such a control device.

In addition, the described advantages are ensurable by carrying out the corresponding method for operating a braking system of a vehicle. The method is refinable in accordance with the above-described specific embodiments of the control device.

DETAILED DESCRIPTION OF THE INVENTION

Figure 1:
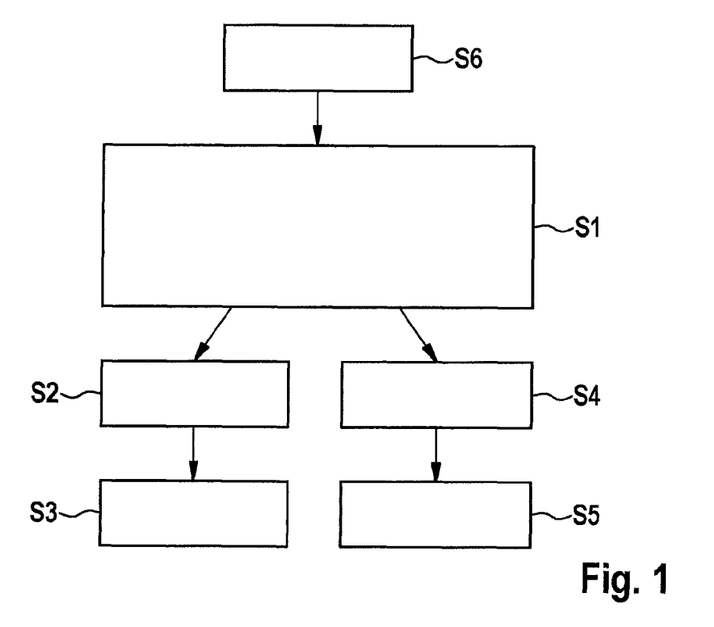
FIG. 1 shows a flow chart to explain a first specific embodiment of the method.

FIG. 1 shows a flow chart to explain a first specific embodiment of the method.

With the aid of the method described in the following it is possible to decelerate a vehicle equipped with at least one hydraulic braking system by a setpoint vehicle deceleration a predefined by a driver of the vehicle and/or by an automatic speed control of the vehicle. For example, with the aid of an actuation of a brake actuating element of the vehicle, for example, a brake pedal, the driver may specify a setpoint variable regarding setpoint vehicle deceleration a to be exerted on the vehicle. The setpoint variable may in particular be an adjustment travel of the brake actuating element, for example, a pedal travel of a brake pedal, a rod travel, a driver braking force exerted on the brake actuating element and/or a corresponding variable. The automatic speed control may be understood to be, for example, an ACC system.

Setpoint vehicle deceleration a and vehicle mass m establish a deceleration force FVL to be exerted on the left front wheel, a deceleration force FVR to be exerted on the right front wheel, a deceleration force FHL to be exerted on the left rear wheel, and a deceleration force FHR to be exerted on the right rear wheel. If the wheels are only decelerated with the aid of the hydraulic braking system (purely hydraulic braking), the following applies for the total of the deceleration forces FVL, FVR, FHL and FHR, according to equation (Eq. 1):

$$\alpha = \frac{FVL + FVR + FHL + FHR}{m} \quad \text{(Eq. 1)}$$

(purely hydraulic braking)

Each of brake forces FVL, FVR, FHL and FHR effectuates a braking torque MVL, MVR, MHL or MHR on the assigned wheel, braking torque MVL exerted on the left front wheel using a radius of left front wheel rVL, a braking torque MVR exerted on the right front wheel using a radius of right front wheel rVR, a braking torque MHL exerted on the left rear wheel using a radius of left rear wheel rHL, and braking torque MHR exerted on the right rear wheel using a radius of right rear wheel rHR resulting according to equations (Eq. 2.1) through (Eq. 2.4) in the following:

$$MVL = FVL * rVL \quad \text{(Eq. 2.1)}$$

$$MVR = FVR * rVR \quad \text{(Eq. 2.2)}$$

$$MHL = FHL * rHL \quad \text{(Eq. 2.3)}$$

$$MHR = FHR * rHR \quad \text{(Eq. 2.4)}$$

According to equations (Eq. 3.1) through (Eq. 3.4), braking torques MVL, MVR, MHL and MHR respectively correlate to a brake pressure pVL in a wheel brake cylinder assigned to the left front wheel, a brake pressure pVR in a wheel brake cylinder assigned to the right front wheel, a brake pressure pHL in a wheel brake cylinder assigned to the left rear wheel, or a brake pressure pHR in a wheel brake cylinder assigned to the right rear wheel as follows:

$$MVL = pVL * cVL \quad \text{(Eq. 3.1)}$$

$$MVR = pVR * cVR \quad \text{(Eq. 3.2)}$$

$$MHL = pHL * cHL \quad \text{(Eq. 3.3)}$$

$$MHR = pHR * cHR \quad \text{(Eq. 3.4)}$$

where cVL is a constant of the wheel brake cylinder assigned to the left front wheel, cVR is a constant of the wheel brake cylinder assigned to the right front wheel, cHL is a constant of the wheel brake cylinder assigned to the left rear wheel, and cHR is a constant of the wheel brake cylinder assigned to the right rear wheel.

Generally, the wheels situated at one axle have the same radii rVL, rVR, rHL and rHR. The constants cVL, cVR, cHL, and cHR of the wheel brake cylinders assigned to one shared axle are normally also equal. Equation (Eq. 1) may thus be rewritten as equation (Eq. 4) as:

$$\alpha = \frac{cVR}{m * rVR} * (pVL + pVR) + \frac{cHR}{m * rHR} * (pHL + pHR) \quad \text{(Eq. 4)}$$

(purely hydraulic braking)

(In equation (Eq. 4) and the other equations, cVL and rVL may also be used instead of cVR and rVR, and/or CHL and rHL may be used instead of cHR and rHR.)

The equations (Eq. 1 and Eq. 4) specified above are valid for carrying out the method described below, during which the deceleration is purely hydraulic. Preferably, however, the method is used for operating a braking system of a vehicle including at least one electric motor operable as a generator. In this case, at least one additional generator braking torque may be exerted on the wheels and/or the axles of the vehicle with the aid of the at least one electric motor. In this way, the brake pressure to be built up in the respective wheel brake cylinders may be reduced by using the at least one electric motor. For each generator braking torque exerted on a wheel and/or on an axle of the vehicle, a "theoretical" brake pressure pgVL, pgVR, pgHL and pgHR may be derived which would have to be built up in the respective wheel brake cylinder in order for a friction braking torque which is equal to the generator braking torque to be exerted.

If the method described below is carried out with the aid of a braking system including at least one electric motor operable as a generator, equation (Eq. 4) specified above may be extended to equation (Eq. 5) as follows:

$$\alpha = \frac{cVR}{m * rVR} * (pVL + pgVL + pVR + pgVR) + \frac{cHR}{m * rHR} * (pHL + pgHL + pHR + pgHR) \quad \text{(Eq. 5)}$$

(hydraulic and regenerative braking), where pgVL is a "theoretical" brake pressure regarding the wheel brake cylinder of the left front wheel, pgVR is a "theoretical" brake pressure regarding the wheel brake cylinder of the right front wheel, pgHL is a "theoretical" brake pressure regarding the wheel brake cylinder of the left rear wheel, and pgHR is a "theoretical" brake pressure regarding the wheel brake cylinder of the right front wheel.

If a shared brake pressure pVR or pHR is present in the wheel brake cylinder of the same brake circuit, equation (Eq. 4) is simplified to equation (Eq. 6) as follows:

$$\alpha = \frac{2 * cVR}{m * rVR} * pVR + \frac{2 * cHR}{m * rHR} * pHR \quad \text{(Eq. 6)}$$

(purely hydraulic braking)

If in addition the same generator braking torque is exerted per axle with the aid of the at least one electric motor, equation (Eq. 5) is simplified to equation (Eq. 7) as follows:

$$\alpha = \frac{2*cVR}{m*rVR}*(pVR+pgVR) + \frac{2*cHR}{m*rHR}*(pHR+pgHR) \quad \text{(Eq. 7)}$$

(hydraulic and regenerative braking)

(In equation (Eq. 7), pgVL may also be inserted instead of pgVR, and/or pgHL instead of pgHR.)

Provided that master brake cylinder pressure pHZ, which prevails in the master brake cylinder of the braking system, is present in all wheel brake cylinders, equation (Eq. 6) is simplified to equation (Eq. 8) as follows:

$$\alpha = \frac{2*cVR}{m*rVR}*pHZ + \frac{2*cHR}{m*rHR}*pHZ \quad \text{(Eq. 8)}$$

(purely hydraulic braking)

(This is true in particular in the case of a partial deceleration.)

Accordingly, equation (Eq. 7) is also simplified to equation (Eq. 9) as follows:

$$\alpha = \frac{2*cVR}{m*rVR}*(pHZ+pgVR) + \frac{2*cHR}{m*rHR}*(pHZ+pgHR) \quad \text{(Eq. 9)}$$

(hydraulic and regenerative braking)

Provided that setpoint vehicle deceleration a is to be ensured with the aid of a setting of master brake cylinder pressure pHZ, equations (Eq. 10) and (Eq. 11) must therefore be adhered to as follows:

$$pHZ = \frac{a*m*rVR*rHR}{2*(cVR*rHR+cHR*rVR)} \quad \text{(Eq. 10)}$$

(purely hydraulic braking)

$$pHZ = \frac{m*a*rVR*rHR - 2*(cVR*pgVR*rHR+cHR*pgHR*rVR)}{2*(cVR*rHR+cHR*rVR)} \quad \text{(Eq. 11)}$$

(hydraulic and regenerative braking)

With the aid of the present invention, it is, however, possible to omit setting master brake cylinder pressure pHZ in such a way that it corresponds to equation (Eq. 10) or (Eq. 11). In this way, no hydraulic component is required for carrying out the advantageous method for a comparably exact setting/controlling of master brake cylinder pressure pHZ. Instead, the method described below implements a much more simple approach for ensuring the desired setpoint vehicle deceleration a.

The method includes a method step S1 in which a first setpoint brake pressure to be set in at least one first wheel brake cylinder of a first brake circuit of the braking system and a second setpoint brake pressure to be set in at least one second wheel brake cylinder of a second brake circuit of the braking system are established. The establishment of the first setpoint brake pressure and of the second setpoint brake pressure takes place taking into account at least the setpoint variable regarding setpoint vehicle deceleration a to be exerted on the vehicle (predefined by the driver with the aid of the actuation of the brake actuating element and/or predefined by the automatic speed control.) In this way, for example, the first setpoint brake pressure may be established for the two wheel brake cylinders of the first brake circuit and the second setpoint brake pressure may be established for the two wheel brake cylinders of the second brake circuit. In particular equation (Eq. 6) (in a braking system without an electric motor operable in generator mode) or equation (Eq. 7) (in a braking system including at least one electric motor operable in generator mode) may be used to establish the setpoint brake pressures.

Often, a constant brake force distribution between the two axles of the vehicle is preferred. In this case, provided that the first brake circuit is assigned to a first axle, and the second brake circuit is assigned to a second axle of the vehicle, equation (Eq. 12) or (Eq. 13) may also be taken into account when establishing the first setpoint brake pressure and the second setpoint brake pressure as follows:

$$C = \frac{\frac{cVR}{rVR}*pVR}{\frac{cHR}{rHR}*pHR} \quad \text{(Eq. 13)}$$

(purely hydraulic braking)

$$C = \frac{\frac{cVR}{rVR}*(pVR+pgVR)}{\frac{cHR}{rHR}*(pHR+pgHR)} \quad \text{(Eq. 13)}$$

(hydraulic and regenerative braking)

where C represents the constant ratio of the brake force distribution.

However, it is pointed out that taking into account at least one of the equations mentioned above in method step S1 is optional. The ability to carry out method step S1 is not limited thereto.

Subsequently to method step S1, a first actual brake pressure present in the first wheel brake cylinder of the first brake circuit is varied taking into account the established first setpoint brake pressure, and a second actual brake pressure present in at least the wheel brake cylinder of the second brake circuit is varied taking into account the established second setpoint brake pressure. For this purpose, at least the method steps S2 and S3 or at least the method steps S4 and S5 are carried out.

Provided that a reduction of the first actual brake pressure corresponding to or equal to the established first setpoint brake pressure and of the second brake pressure corresponding to or equal to the established second setpoint brake pressure is advantageous/desired, method steps S2 and S3 may be carried out. In method step S2 carried out initially, master brake cylinder pressure pHZ in the master brake cylinder of the braking system is set to be smaller than or equal to a minimum of the first setpoint brake pressure and the second setpoint brake pressure. Master brake cylinder pressure pHZ may, for example, be set/controlled in such a way that it is below half of the minimum of the first setpoint brake pressure and of the second setpoint brake pressure.

Preferably, master brake cylinder pressure pHZ is for this purpose reduced with the aid of at least one plunger. Since during the setting of master brake cylinder pressure pHZ in method step S2 even a comparably large deviation of the set master brake cylinder pressure pHZ (compared to a predefined setpoint pressure) does not/hardly result(s) in disadvantages during carrying out the method described here, the activation pattern of the at least one plunger used to set master brake cylinder pressure pHZ is simplified. In this way, method step S2 may be carried out reliably with the aid of at least one comparatively cost-effective plunger.

In one method step S3, one first switchover valve of the first brake circuit is controlled in order to additionally reduce the first actual brake pressure and/or a second switchover valve of the second brake circuit is controlled in order to additionally reduce the second actual brake pressure. In this way, a pressure reduction corresponding to a difference between the respective setpoint brake pressure and master brake cylinder pressure pHZ may be carried out reliably and quickly. In addition, the use of the switchover valves, via which brake fluid is transferable from the respective wheel brake cylinder into at least one storage volume/the at least one plunger, enables a recirculation without the operation of a recirculation pump. Method step S3 may thus be carried out noiselessly. Furthermore, by using the switchover valves it is also ensured that the driver does not feel any vibration/no recoil of the brake actuating element despite the recirculation.

Preferably, in method step S3, the first switchover valve is controlled to a $\Delta p$ control of the first actual brake pressure to be reduced and/or the second switchover valve is controlled to a $\Delta p$ control of the second actual brake pressure to be reduced. By using the $\Delta p$ control, the dependency of the set actual brake pressures on the volume intake of the braking system is also eliminated in a first approximation.

Provided that an increase of the first actual brake pressure corresponding to or equal to the established first setpoint brake pressure and of the second actual brake pressure corresponding to or equal to the established second setpoint brake pressure is desired, method steps S4 and S5 may be carried out. In a method step S4, master brake cylinder pressure pHZ is set to be greater than or equal to a maximum of the first setpoint brake pressure and of the second setpoint brake pressure. For example, master brake cylinder pressure pHZ may be set/controlled to be greater than or equal to twice the maximum of the first setpoint brake pressure and of the second setpoint brake pressure.

The increase of master brake cylinder pressure pHZ carried out in method step S4 may also be carried out with the aid of at least one (cost-effective) plunger. In the method described here, the common limitation when using at least one plunger which may conventionally often only be used as a "volume setter" and not as a "pressure setter" with a desired accuracy is eliminated. Since the at least one plunger is only used in the method described here as a "volume setter," even a cost-effective plunger is sufficient to carry out the method described here.

In a method step S5, at least one first wheel inlet valve of the first brake circuit is controlled in order to additionally increase the first actual brake pressure and/or at least one second wheel inlet valve of the second brake circuit is controlled in order to additionally increase the second actual brake pressure. Also with method step S5, a pressure buildup by a pressure difference, which corresponds to a difference between master brake cylinder pressure pHZ and the respective setpoint brake pressure, may be reliably and accurately carried out.

Preferably, the at least one first wheel inlet valve is controlled to a $\Delta p$ control of the first actual brake pressure to be increased and/or the at least one second wheel inlet valve is controlled to a $\Delta p$ control of the second actual brake pressure to be increased in method step S5. It is once more pointed out that by using the $\Delta p$ control, the dependency of the set actual brake pressures on the volume intake of the hydraulics is eliminated in a first approximation. Since the volume intake of the hydraulics fluctuates highly over the service life of the braking system, the method described here thus ensures a correction/avoidance of common disadvantages/difficulties when operating a hydraulic braking system.

The method described above allows an optimized operation of the used braking system regarding the pressure setting accuracy and noise-optimized controlling. The method may also be used for the optimized use of a recuperation potential of the at least one electric motor operable as a generator of the vehicle.

As a function of a maximally available generator braking torque of the at least one electric motor, a blending by varying the hydraulically exerted braking torques MVL, MVR, MHL and MHR may be carried out reliably and simply with the aid of the method described here. Due to the rapid and reliable settability of the desired actual brake pressures with the aid of method steps S2 through S4, the vehicle may respond early to changes of setpoint vehicle deceleration a and/or of the maximally exertable generator braking torque. It is once more pointed out that the method described here may also be carried out when no more accurate information regarding the characteristic of the hydraulics, in particular regarding its volume intake, is known.

Furthermore, the method described here ensures a distribution of the braking torques between front axle and rear axle according to the desired constant brake force distribution C. Even during a blending, due to the simple and rapid settability of the desired actual brake pressures, a destabilization of the desired constant brake force distribution C is eliminated. In particular in this way, a pitch of the vehicle, which is perceived as undesirable, is reliably prevented.

In one refinement, the method may also include a method step S6. In method step S6, a setpoint variable regarding a booster force to be exerted on the brake actuating element with the aid of a brake booster is established taking into account the setpoint variable, the first setpoint brake pressure, the second setpoint brake pressure, the ascertained or estimated first actual brake pressure and/or of the ascertained or estimated second actual brake pressure. The brake booster is subsequently activated accordingly in method step S6. In particular in this way, the booster force exerted with the aid of the brake booster may be established in such a way that the driver feels a response of the braking system corresponding to predefined setpoint vehicle deceleration a, independently of the actually present actual brake pressures during actuation of the brake actuating element. With the aid of the method described here, an advantageous/comfortable brake actuating feeling (pedal feeling) may also be ensured for the driver.

Figure 2:
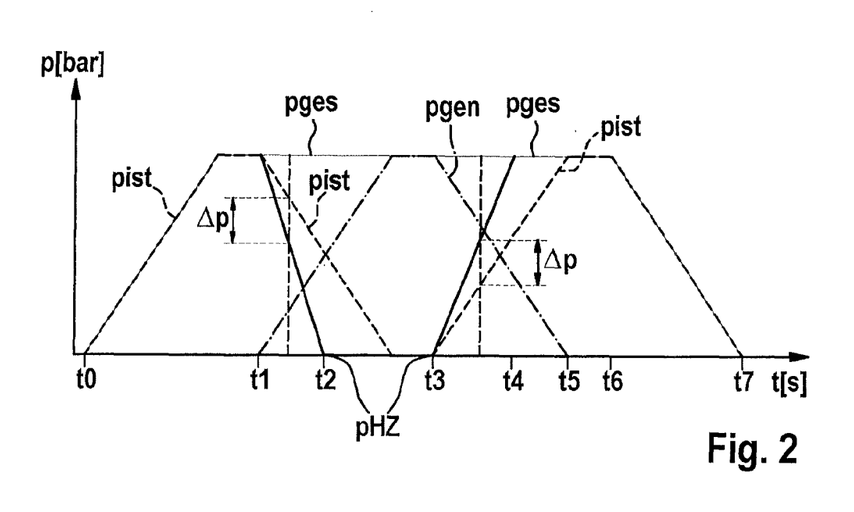
FIG. 2 shows a coordinate system to explain a second specific embodiment of the method.

FIG. 2 shows a coordinate system to illustrate a second specific embodiment of the method.

The abscissa of the coordinate system in FIG. 2 is time axis t (in seconds s.) With the aid of the coordinate of the coordinate system in FIG. 2, pressures p are represented (in bar).

The driver actuates the brake actuating element implemented as a brake pedal beginning at a point in time t0. The driver displaces brake fluid with the aid of the actuation of the brake actuating element from the master brake cylinder of the braking system to the connected wheel brake cylinders and in this way builds up an actual brake pressure pist in the wheel brake cylinders. (For the sake of clarity, only one brake pressure pist in the wheel brake cylinders is mentioned in the following.)

The use of the at least one electric motor operable as a generator of the braking system is still omitted between times t0 and t1. This may take place, for example, because the generator potential between times t0 and t1 is not yet sufficient.

Only from time t1 on, the at least one electric motor is used for additional deceleration of the vehicle. For example, the at least one used electric motor may in this way be used to charge a battery. The at least one electric motor thus effectuates, starting at time t1, a generator braking torque unequal to zero, from which the "theoretical" generator brake pressure pgen, already mentioned above, may be derived. (For the sake of clarity, only one "theoretical" brake pressure pgen is assumed.) In order to ensure that the setpoint vehicle deceleration predefined by the driver is not exceeded despite the operation as a generator of the at least one electric motor, actual brake pressure pist present at the wheel brake cylinders is reduced starting at time t1. To achieve this, master brake cylinder pressure pHZ present in the master brake cylinder is strongly reduced between times t1 and t2 by carrying out method step S2. For example, master brake cylinder pressure pHZ may be reduced to zero by time t2.

With the aid of carrying out the above-described method step S3, a desired brake pressure difference $\Delta p$ may be set in the master brake cylinders compared to master brake cylinder pressure pHZ in such a way that despite the strong drop in master brake cylinder pressure pHZ, a higher actual brake pressure pist is reliably maintainable in the wheel brake cylinders.

With decreasing vehicle speed, the generator braking torque maximally executable with the aid of the at least one electric motor is reduced. Starting at time t3, the generator braking torque exertable with the aid of the at least one electric motor therefore decreases again. Starting at time t3, the "theoretical" (generator) brake pressure pgen thus also decreases.

By increasing the actual brake pressure pist, the decrease of the "theoretical" brake pressure pgen may be compensated for/blended. For this purpose, master brake cylinder pressure pHZ is increased considerably between times t3 and t4 with the aid of method step S4. In particular master brake cylinder pressure pHZ may again be controlled to its value at point in time t1.

By carrying out method step S5, the strong increase of master brake cylinder pressure pHZ may be compensated for in such a way that a desired pressure difference of $\Delta p$ is present between the master brake cylinder and the wheel brake cylinders. In particular, the actual brake pressure pist may be increased so slowly that only at a time t5 does it become equal to master brake cylinder pressure pHZ. Starting at a time t6, the driver reduces the actuation of the brake actuating element, and the actual brake pressure pist is again accordingly decreased. At time t7, the actuation of the brake actuating element is ended.

As is apparent from FIG. 2, with the aid of the approach described here, the actual brake pressure pist may be adapted to the chronologically varying "theoretical" (generator) brake pressure pgen in such a way that a total brake pressure pges may be maintained constantly as a total of brake pressures pist and pgen also between times t1 through t5. Total brake pressure pges may in particular correspond to predefined setpoint vehicle deceleration a.

Figure 3:
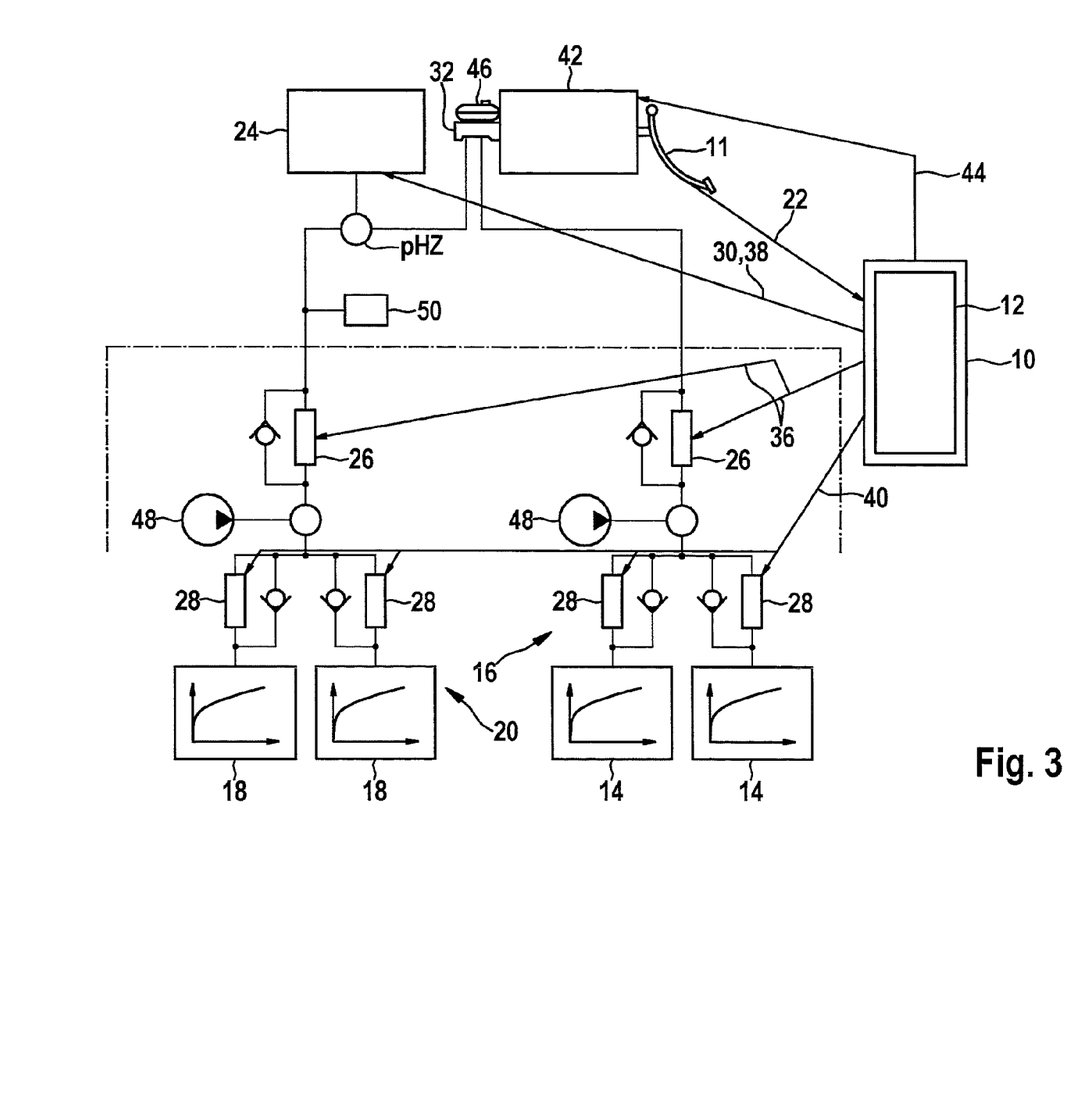
FIG. 3 shows a schematic view of a specific embodiment of the control device.

FIG. 3 shows a schematic illustration of one specific embodiment of the control device.

Control device 10 includes an activating unit 12, with the aid of which a first setpoint brake pressure to be set in at least one first wheel brake cylinder 14 of a first brake circuit 16 of the braking system may be established, and a second setpoint brake pressure to be set in at least one second wheel brake cylinder 18 of a second brake circuit 20 of the braking system may be established. Activating unit 12 is designed to carry out the establishment of the setpoint brake pressures, at least taking an input signal 22 regarding the setpoint vehicle deceleration into account which is predefinable by the driver with the aid of the actuation of brake actuating element 11 and/or by the automatic speed control (not shown). Furthermore, at least one component 24 through 28 of the braking system is activatable with the aid of the activating unit so that a first actual brake pressure present in at least first wheel brake cylinder 14 of first brake circuit 16 is variable taking the established first setpoint brake pressure into account, and that a second actual brake pressure present in second wheel brake cylinder 18 of second brake circuit 20 is variable taking the established second setpoint brake pressure into account.

For example, the first actual brake pressure is reducible corresponding to or equal to the established first setpoint brake pressure, and the second actual brake pressure is reducible corresponding to or equal to the established second setpoint brake pressure, the activating unit 12 being designed to output at least one first control signal 30 to a master brake cylinder pressure varying device 24, which is controllable with the aid of at least one first control signal 30 in such a way that master brake cylinder pressure pHZ in a master brake cylinder 32 of the braking system is settable to be smaller than or equal to a minimum of the first setpoint brake pressure and of the second setpoint brake pressure. In this case, at least one second control signal 36 may also be output to a first switchover valve 26 of first brake circuit 16 and/or to a second switchover valve 26 of second brake circuit 20 with the aid of activating unit 12. Switchover valves 26 are respectively controllable with the aid of the at least one second control signal 36 in such a way that the first actual brake pressure and/or the second actual brake pressure is/are additionally reducible due to a brake fluid transfer through the controlled switchover valves 26.

As an alternative or as an addition, the first actual brake pressure may also be increased corresponding to or equal to the established first setpoint brake pressure, and the second actual brake pressure may be increased corresponding to or equal to the established second setpoint brake pressure. In this case, activating unit 12 is also designed to output at least one third control signal 38 to master brake cylinder pressure varying device 24, which is controllable with the aid of the at least one third control signal 38 in such a way that the master brake cylinder pressure is settable to be greater than or equal to a maximum of the first setpoint brake pressure and the second setpoint brake pressure. Furthermore, at least one fourth control signal 40 may also be output to at least one first wheel inlet valve 28 of first brake circuit 16 and/or to at least one second wheel inlet valve 28 of second brake circuit 20 with the aid of activating unit 12. Wheel inlet valves 28 are respectively controllable with the aid of the at least one fourth control signal 40 in such a way that the first actual brake pressure and/or the second actual brake pressure may be additionally increased due to a brake fluid transfer through the controlled wheel inlet valves 28.

Preferably, activating unit 12 is also designed to control a $\Delta p$ control of the first actual brake pressure to be reduced through first switchover valve 26 and/or a $\Delta p$ control of the second actual brake pressure to be reduced through second switchover valve 26 with the aid of the at least one second control signal 36. Activating unit 12 may also be designed to control a $\Delta p$ control of the first actual brake pressure to be increased through the at least one first wheel inlet valve 28 and/or a Δp control of the second actual brake pressure to be increased through the at least one second wheel inlet valve 28 with the aid of the at least one fourth control signal 40. This ensures the above-described advantages.

Furthermore, activating unit 12 may also be designed to activate at least one plunger 24 as a master brake cylinder pressure varying device 24 with the aid of the at least one first control signal 30 and/or the at least one third control signal 38. As already described above, a cost-effective plunger type may be used for cooperating with activating unit 12.

In one refinement, activating unit 12 is also designed to establish the first setpoint brake pressure and/or the second setpoint brake pressure while additionally taking into account at least one generator braking torque exertable on at least one axle assigned to the at least one first wheel brake cylinder 14 and/or the at least one second wheel brake cylinder 16 with the aid of at least one electric motor. Control device 10 may therefore also be used for blending a chronologically varying generator braking torque.

In another refinement, activating unit 12 is additionally designed to establish a setpoint variable regarding a booster force to be exerted on brake actuating element 11 with the aid of brake booster 42, taking into account input signal 22, the first setpoint brake pressure, the second setpoint brake pressure, the ascertained or estimated first actual brake pressure and/or the ascertained or estimated second actual brake pressure, and to output a brake booster control signal 44 which corresponds to the setpoint variable to the brake booster 42. Control device 10 may thus effectuate with the aid of at least one plunger 24 a fluctuating pressure difference for controlling the ESP system, carry out the desired axle-specific pressure setting via the ESP system with high accuracy and simultaneously ensure a standard/comfortable brake actuating feeling (pedal feeling) by activating brake booster 42.

The advantages of control device 10 are also ensured in a braking system equipped with it. The braking system illustrated in FIG. 3 is shown only partially. For example, the braking system may include wheel outlet valves and storage chambers in addition to brake fluid reservoir 46, recirculation pump 48 and a pressure sensor 50. Since these components of the braking system are, however, not required for the function of control device 10, their illustration in FIG. 3 is dispensed with.

What is claimed is:

1. A control device for a braking system of a vehicle, comprising:
an activating unit that sets a first setpoint brake pressure in at least one first wheel brake cylinder of a first brake circuit of the braking system, and that sets a second setpoint brake pressure in at least one second wheel brake cylinder of a second brake circuit of the braking system, wherein the activating unit sets the first setpoint brake pressure and the second setpoint brake pressure taking into consideration an input signal regarding a setpoint vehicle deceleration, the setpoint vehicle deceleration being predefined at least one of: i) by a driver using an actuation of a brake actuating element of the vehicle, and ii) by an automatic speed control of the vehicle, at least one component of the braking system being controlled with the aid of the activating unit so that a first actual brake pressure present in at least the first wheel brake cylinder of the first brake circuit is variable taking into account the established first setpoint brake pressure, and a second actual brake pressure present in the at least second wheel brake cylinder of the second brake circuit is variable taking the established second setpoint brake pressure into account;
wherein at least one of:
(a) the first actual brake pressure is reduced according to the established first setpoint brake pressure, and the second actual brake pressure is reduced according to the established second setpoint brake pressure, the activating unit being configured to output at least one first control signal to a master brake cylinder pressure varying device, which is controlled with the aid of the at least one first control signal in such a way that a master brake cylinder pressure is set in a master brake cylinder of the braking system to be no greater than a minimum of the first setpoint brake pressure and the second setpoint brake pressure, and output at least one second control signal to at least one of a first switchover valve of the first brake circuit and a second switchover valve of the second brake circuit, the first and second switchover valves being respectively controlled with the aid of the at least one second control signal in such a way that at least one of the first actual brake pressure and the second actual brake pressure is additionally reduced; and
(b) the first actual brake pressure is increased according to the established first setpoint brake pressure, and the second actual brake pressure is increased according to the established second setpoint brake pressure, the activating unit being configured to output at least one third control signal to the master brake cylinder pressure varying device, which is controlled with the aid of the at least one third control signal in such a way that the master brake cylinder pressure is set to be no smaller than a maximum of the first setpoint brake pressure and the second setpoint brake pressure, and output at least one fourth control signal to at least one of a first wheel inlet valve of the first brake circuit and a second wheel inlet valve of the second brake circuit, the first and second wheel inlet valves being respectively controlled with the aid of the at least one fourth control signal in such a way that at least one of the first actual brake pressure and the second actual brake pressure is additionally increased.

2. The control device as recited in claim 1, wherein the activating unit is configured to provide at least one of (i) a differential pressure control of the first actual brake pressure to be reduced through the first switchover valve with the aid of the at least one second control signal, and (ii) a differential pressure control of the second actual brake pressure to be reduced through the second switchover valve with the aid of the at least one second control signal.

3. The control device as recited in claim 1, wherein the activating unit is configured to provide at least one of (i) a differential pressure control of the first actual brake pressure to be increased through the at least one first wheel inlet valve with the aid of the at least one fourth control signal, and (ii) a differential pressure control of the second actual brake pressure to be increased through the at least one second wheel inlet valve with the aid of the at least one fourth control signal.

4. The control device as recited in claim 1, wherein the activating unit is configured to control at least one plunger as a master brake cylinder pressure varying device with the aid of at least one of the first control signal and the third control signal.

5. The control device as recited in claim 1, wherein the activating unit is configured to establish at least one of the first setpoint brake pressure and the second setpoint brake pressure while additionally taking into account at least one generator braking torque exerted with the aid of at least one electric motor on at least one axle assigned to at least one of the first wheel brake cylinder and the second wheel brake cylinder.

6. The control device as recited in claim 1, wherein the activating unit is configured to establish a setpoint variable regarding a booster force to be exerted on the brake actuating element with the aid of a brake booster, taking into account at least one of input signal, the first setpoint brake pressure, the second setpoint brake pressure, the ascertained first actual brake pressure, and the ascertained second actual brake pressure, and to output to the brake booster a brake booster control signal which corresponds to the setpoint variable.

7. The control device as recited in claim 1, wherein the first switchover valve is situated between the master brake cylinder and at least one first wheel inlet valve assigned to the at least one first wheel brake cylinder, and the second switchover valve is situated between the master brake cylinder and at least one second wheel inlet valve assigned to the at least one second wheel brake cylinder valve.

8. A method for operating a braking system of a vehicle, comprising:
  establishing a first setpoint brake pressure to be set in at least one first wheel brake cylinder of a first brake circuit of the braking system and a second setpoint brake pressure to be set in at least one second wheel brake cylinder of a second brake circuit of the braking system, taking into account at least one setpoint variable regarding a setpoint vehicle deceleration to be exerted on the vehicle predefined at least one of (a) by a driver with the aid of an actuation of a brake actuating element of the vehicle and (b) by an automatic speed control of the vehicle; and
  varying a first actual brake pressure present in at least the first wheel brake cylinder of the first brake circuit, taking into account the established first setpoint brake pressure, and varying a second actual brake pressure present in at least the second wheel brake cylinder of the second brake circuit, taking into account the established second setpoint brake pressure, wherein the varying takes place by at least one of:
  (i) reducing the first actual brake pressure according to the established first setpoint brake pressure and reducing the second actual brake pressure according to the established second setpoint brake pressure by:
  setting a master brake cylinder pressure in a master brake cylinder of the braking system to be no greater than a minimum of the first setpoint brake pressure and the second setpoint brake pressure; and
  activating at least one of a first switchover valve of the first brake circuit for additionally reducing the first actual brake pressure and a second switchover valve of the second brake circuit for additionally reducing the second actual brake pressure; and
  (ii) increasing the first actual brake pressure according to the established first setpoint brake pressure and increasing the second actual brake pressure according to the established second setpoint brake pressure by:
  setting the master brake cylinder pressure to be no smaller than a maximum of the first setpoint brake pressure and the second setpoint brake pressure; and
  controlling at least one of a first wheel inlet valve of the first brake circuit for additionally increasing the first actual brake pressure and a second wheel inlet valve of the second brake circuit for additionally increasing the second actual brake pressure.

9. The method as recited in claim 8, wherein at least one of (i) the first switchover valve is controlled to achieve a differential pressure control of the first actual brake pressure to be reduced, and (ii) the second switchover valve is controlled to achieve a differential pressure control of the second actual brake pressure to be reduced.

10. The method as recited in claim 8, wherein at least one of (i) the first wheel inlet valve is controlled to achieve a differential pressure control of the first actual brake pressure to be increased, and (ii) the second wheel inlet valve is controlled to achieve a differential pressure control of the second actual brake pressure to be increased.

11. The method as recited in claim 8, wherein the master brake cylinder pressure is at least one of reduced and increased with the aid of a plunger.

12. The method as recited in claim 8, wherein a setpoint variable regarding a booster force to be exerted on the brake actuating element with the aid of a brake booster is established, taking into account at least one of the setpoint variable regarding the setpoint vehicle deceleration, the first setpoint brake pressure, the second setpoint brake pressure, the ascertained first actual brake pressure, and the ascertained second actual brake pressure, and wherein the brake booster is activated in accordance with the setpoint variable regarding the booster force to be exerted.

13. The method as recited in claim 8, wherein the first switchover valve is situated between the master brake cylinder and at least one first wheel inlet valve assigned to the at least one first wheel brake cylinder, and the second switchover valve is situated between the master brake cylinder and at least one second wheel inlet valve assigned to the at least one second wheel brake cylinder valve.

* * * * *